Figure 1:
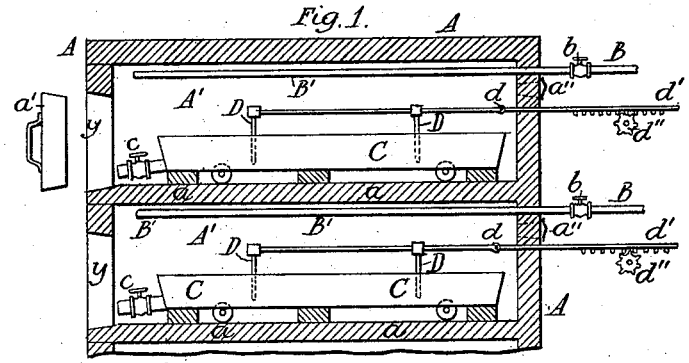

(No Model.) 2 Sheets—Sheet 1.

B. F. McINTYRE.
PROCESS OF CONDENSING AND PRESERVING MILK.

No. 523,677. Patented July 31, 1894.

Witnesses
Will F Norton
M. A. M. Fraysser.

Inventor
Byron F. McIntyre.

THE NORRIS PETERS CO., PHOTO-LITHO., WASHINGTON, D. C.

(No Model.) 2 Sheets—Sheet 2.
B. F. McINTYRE.
PROCESS OF CONDENSING AND PRESERVING MILK.
No. 523,677. Patented July 31, 1894.
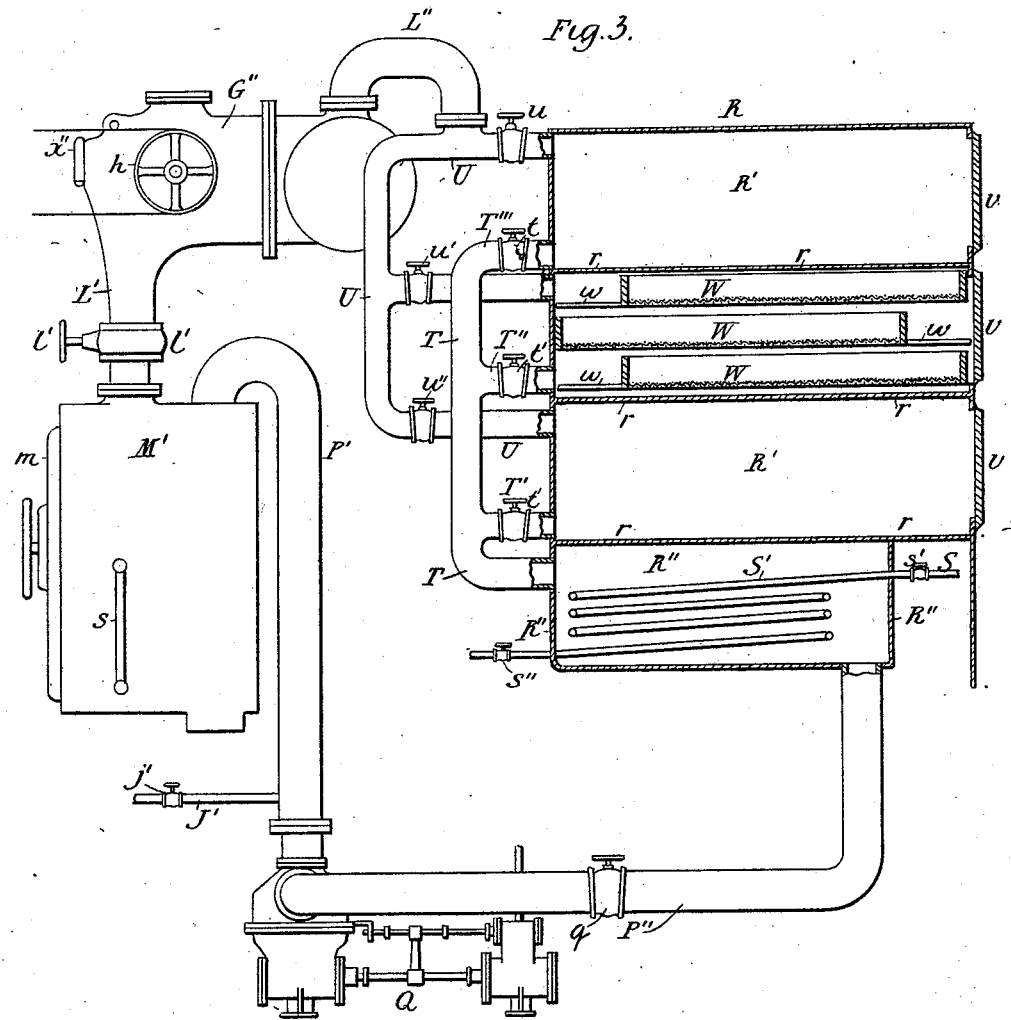

UNITED STATES PATENT OFFICE.

BYRON F. McINTYRE, OF EAST ORANGE, NEW JERSEY, ASSIGNOR TO JOHN A. RILEY, OF SAME PLACE.

PROCESS OF CONDENSING AND PRESERVING MILK.

SPECIFICATION forming part of Letters Patent No. 523,677, dated July 31, 1894.

Application filed February 16, 1893. Renewed December 30, 1893. Serial No. 495,264. (No specimens.)

*To all whom it may concern:*

Be it known that I, BYRON F. MCINTYRE, a citizen of the United States, residing at East Orange, in the county of Essex and State of New Jersey, have invented a certain new and useful Improvement in Processes of Condensing and Preserving Milk; and I do hereby declare the following to be a full, clear, and exact description of the invention, such as will enable others skilled in the art to which it appertains to make and use the same.

This invention relates to the process of preparing condensed or concentrated milk, preferably in the form of a powder, and adapted for the trade and general use as a condensed milk, and especially adapted for use as a food for infants and invalids.

My milk product is prepared by subjecting fresh milk to a process of concentration by first freezing out the watery portion and separating the remaining constituents in a semi-liquid condition, from the ice crystals with a centrifugal machine, or by other means, till reduced to the desired specific gravity or consistence,—then sterilizing the product by freezing it in thin flakes at a suitable temperature below zero to destroy pathogenic germs,—then continuing the operation of drying the partially concentrated product at a comparatively low temperature,—about 100° Fahrenheit—in a vacuum pan; then molding the resulting semi-solid product at or below a freezing temperature so as to form blocks or cakes,—then shaving or chipping such blocks into thin chips or shavings,—then completely drying such shavings by means of dry, warm carbonic acid gas, or equivalent non-oxidizing gas, circulated over and through them while contained in trays in close chambers,—and finally powdering the product and filling it into cans or jars from which air is excluded and in the presence of carbonic acid gas or other non-oxidizing gas.

The object of my invention is to produce an improved condensed or powdered milk product, without changing or toughening the albuminoids, as is ordinarily the case by the boiling process, but, on the contrary, preserve them in their natural soluble condition;—also to prepare the milk without discoloration and without imparting to the product an unnatural and unpleasant cooked odor and taste, but on the contrary, preserve its natural, sweet pleasant flavor; also to avoid melting and bursting the globules of natural milk fat or cream and therefore preserve it in the pure agreeable form in the concentrated product; also to sterilize and preserve the finished product in the presence of a non-oxidizing gas, whereby deterioration and rancidity are avoided, and a more agreeable and nutritious product is presented to the consumer.

I will now describe the details of my process in connection with the accompanying drawings which illustrate an apparatus suitable for use in carrying out the main steps or operations of the process, and in which—

Figure 2:
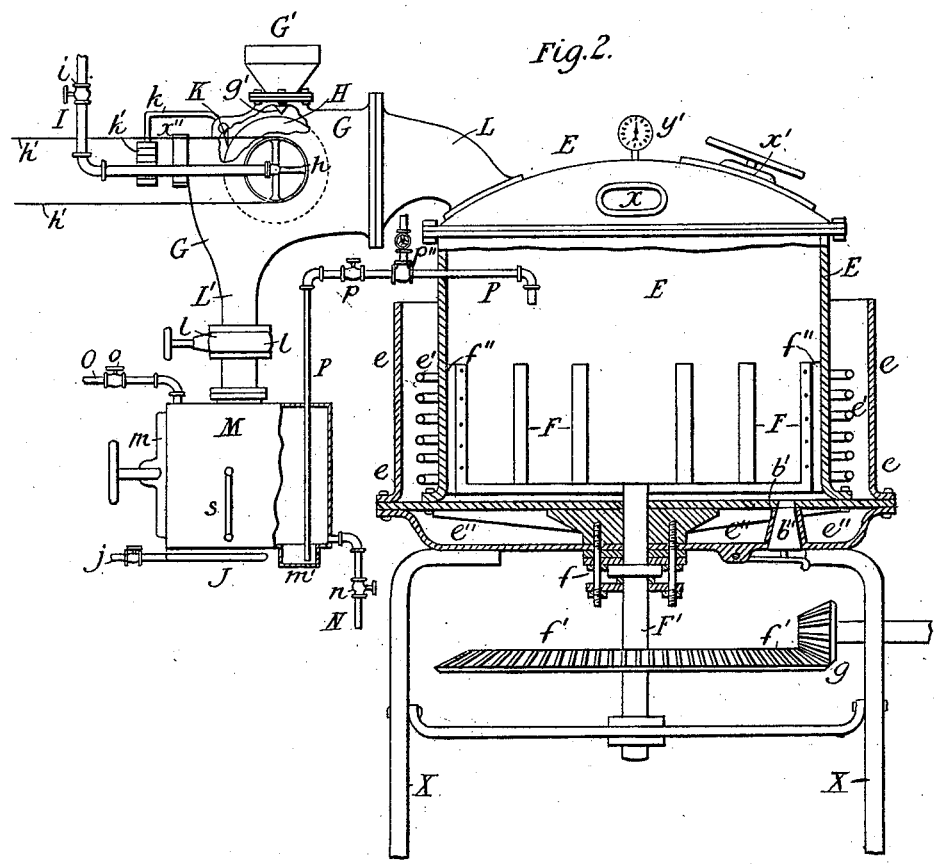

Figure 1 represents a vertical longitudinal section of suitable freezing closets or chambers. Fig. 2 represents a view partly in elevation and partly in section of a vacuum pan and devices for sterilizing the product by refrigeration and comminuting or chipping it by a knife or scraper. Fig. 3 represents a drying apparatus partly in elevation and partly in vertical section.

For the purpose of freezing out the watery portion of the milk in the form of ice crystals or granules, I provide a freezing closet, A, (Fig. 1) divided by horizontal partitions $a$, into chambers, A', one above another, and said chambers or compartments are provided at the front with openings, $y$, having tight fitting doors, $a'$, and also having in their walls the sight holes, $a''$, closed by disks of glass. Pipes B, having valves, $b$, and conveying cold brine or other refrigerant connect with the interior coils B', arranged close to the tops of the chambers, A', above the milk trays. The milk pans or trays, C, are made of galvanized iron, and are preferably broad and shallow, as shown, and may be provided with small wheels or rollers, and are provided at their front ends with short spouts, having valves, $c$. The pans may be made of about three hundred gallons capacity. The valves, $c$, may be gate valves adapted for drawing off the thick granular milk. Each chamber is provided with an agitating rake or stirrer, D, having a long handle which may have a pivoted joint, $d$, as shown, and the outer end of the handle is constructed in the form of a rack-bar, d', with which there engages the pinion, d'', which, in practice, will be connected with reversing gearing and pulleys for reciprocating the rakes or stirrers within the pans, C. Two or more rakes or stirrers may be attached to each handle and extend down into each pan, C as shown. By means of the pivotal joints, d, the rakes may be raised when it is desired to remove the pan, C, from the chamber.

My refrigerating sterilizing devices, in connection with a vacuum pan, are illustrated in Fig. 2. The vacuum pan, E (which may be of a kind in general use) is mounted upon frame X, and is provided with an annular water jacket, e, containing heating coils, e', and also with a separate water or steam jacket, e'', at the bottom, independent of the upper jacket. The pan is provided with a stirring device, F, which in practice, has knife-edged bars f''' for scraping the surface of the pan. The shaft, F', to which the stirrer is attached extends down through a gland f, at the bottom of the pan, and is provided with a large beveled gear wheel, f', which meshes with a beveled pinion, g, secured upon the horizontal shaft. The bottom of the pan is provided with an opening or spout, b', extending through the lower jacket and having a closing stopper or plug, b'', to permit the removal of the condensed semi-solid milk product. The dome of the pan is provided with the usual sight opening, x, a man hole and lid, x', and vacuum gage, y'. Adjacent to the pan, or at any suitable distance therefrom, I arrange a refrigerating casing, G, having at the top a long funnel, G', which is tapered at the bottom to form a narrow discharge mouth, g', for distributing the milk upon the freezing cylinder, H, just below it.

The freezing cylinder, H, is made hollow, and in practice is provided with suitable hollow journals, with which connect pipes, such as I, having a valve, i, for circulating the refrigerating liquid such as glycerine. The journal has also a belt pulley, h, around which passes a belt, h', for revolving the cylinder. At one side of the casing, and preferably near its top, there is secured a pivoted knife or scraper, K, which is adapted to bear at its cutting edge upon the surface of the cylinder J, and the shaft of such knife is provided with an arm, k, to the outer end of which is attached weights, k', for causing the edge of the knife to bear more closely upon the periphery of the cylinder and cut or scrape therefrom the films or layers of ice in the form of flakes or chips. The knife or scraper is made adjustable and can be thrown out of contact with the cylinder when desired, so that the operation of cutting or shaving the ice can be made intermittent.

A revolving, cutting, or chipping device, may be used for removing ice from the freezing cylinder, but I do not illustrate such device, as the apparatus and machinery is not herein claimed.

The freezing cylinder, H, will in practice, be provided with an inlet and an outlet pipe, one at each end, for conveying cold glycerine or other refrigerant. The casing, G, connects by pipe, L, with the top of the vacuum pan, and by a pipe L', having a gate valve, l with the top of the box or other receptacle, M, for the chipped or comminuted ice removed from cylinder H. Box M is provided at one side with a large tight fitting lid, m, and at the bottom with a depression or well, m', and at the side with a liquid gage s. A heating coil, J, having an inlet valve, j, is preferably arranged below the box M. A steam inlet pipe, N, having a valve, n, connects with the bottom of the box, M, and an outlet pipe, O, having valve, o, connects with the top thereof. The gate valve, l, being closed, the vacuum in ice box M, may be broken by opening valve, o. Air may be driven out and the vacuum produced by admitting steam through pipe N, which condenses in contact with the solid contents and surfaces of the walls. A pipe, P, having valve, p, extends down through box, M, into the well m' and connects the latter with the interior of the vacuum pan, E, for conveying liquefied milk into the vacuum pan, where the further operation of drying out and reducing the product to a doughy consistency takes place at the low temperature of about 100° Fahrenheit.

My cooling and drying apparatus is illustrated in Fig. 3, in which R designates a casing divided by horizontal partitions, r, into separate chambers or closets, R', which are provided at one end with tight fitting doors, v. Below the drying chambers, R', I place a warming chamber, R'', containing steam or hot water coils, S', having a supply pipe S, provided with a valve s', and an outlet pipe having a valve, s''. In connection with my drying chamber, I use a refrigerating casing, G'', containing a revolving freezing cylinder having a pulley, h, like those described above with reference to Fig. 2. The casing, G'', connects by pipe L', having valve, l' with an ice box, M', constructed like the one heretofore described. A large pipe, P', leads from the top of box, M', to the exhaust pump, Q, which connects by pipe P'', having a valve, q, with the warming chamber, R''. A pipe J', having a valve, j', connects with pipe P', for admitting thereto carbonic acid gas or any suitable non-oxidizing gas such as nitrogen or carbonic oxide, or a mixture of any two or more of these gases such as carbonic acid, carbonic oxide, and nitrogen, for circulation through the warming chamber, thence through the drying chambers, and thence through the refrigerating chambers in contact with the freezing cylinder for condensing and removing any contained moisture.

The warming chamber, R'', connects by pipe T, and branches T', T'', T''', with the drying chambers, and a pipe, U, connects by suitable branch pipes, having valves u, u', and u'', with the drying chambers for conducting off moist gas and vapor, which is conveyed by pipe L″ to the cooling casing G″. The drying chambers, R′, R′, are provided with cleats or guide ways secured to the side walls for receiving and supporting the trays, W, containing moist food shavings to be desiccated, as will be hereinafter more fully described.

I will now describe my process under three principal heads or divisions; first, separation of water from milk solids, mainly by freezing to form ice crystals or granules, and separation of the remaining unfrozen constituents containing milk solids from said crystals or granules;—second, sterilization, drying, and reduction to powder; third, filling the finished product into jars or cans and preservation thereof in the presence of carbonic acid gas or other non-oxidizing gas.

Heretofore concentration of milk has been effected by a process of boiling, usually in a vacuum pan, produced by vacuum pumps and vapor condensers, and by application of high pressure steam heat to the jacket of the pan. This is necessarily done as quickly as possible, but with the most approved apparatus, the milk is subjected to a long process of boiling and chemical changes are wrought by the heat, which diminish and change the nutritive value of the milk constituents, and impart a cooked milk odor and taste to the product. The prolonged heating of the milk, at the comparatively high temperature employed also ruptures the fat globules, changing them in their physical appearance, and instead of being granular, they become salvey, and are more easily made rancid by exposure to atmospheric air. My cold process insures the integrity of these globules, and under the conditions detailed in this process, the milk fat is preserved in the original form, less the water required for their suspension as in milk.

The process of separation of water, from extractive or solid matter by freezing is not broadly claimed, except in its application to milk.

In treating a large volume of milk, it is preferably first subjected to centrifugal action in a separating machine to separate the cream or milk fat therefrom, and such separated cream is reserved and added at a further stage of the process, as will be described below. Ordinarily the separated milk only need be subjected to the freezing process, for the purpose of producing a concentrated semi-liquid product. The separated milk is filled into the pans, C, which are placed in the freezing closets and the doors of the latter tightly closed. The brine or other refrigerant, is circulated in the coil, and the operation of freezing the milk started. After the ice crystals begin to form, the rakes or stirrers, D, are started into operation for breaking up the ice as it forms upon the surface and changing it to a granular or crystalline form. The freezing and agitation is continued until the whole body of milk in each pan has been changed to a soft granular condition, after which the mixture is transferred to a centrifugal machine where the unfrozen portion containing the milk solids is separated in a liquid or semi-liquid form from the ice crystals or granules. During the operation of the centrifugal machine the crystals may be washed with fresh milk which has been previously cooled to 32° Fahrenheit and then live steam is momentarily projected against the wall of granular ice in the machine until the crystals are freed from all adhering milk. This treatment with steam is important and prevents the regelation of the crystals or granules of ice and the consequent locking up of milk solids within their interstices.

Instead of treating the mass of granular milk received from the freezing trays in a centrifugal machine, they may be placed upon a tray having a screen or false bottom of wire netting and connecting below with an exhaust pump or other suction device. Live steam may then be momentarily projected against the layer of granular ice during the operation of the suction device, so as to remove the coating of milk in liquid form from the ice crystals. The crystals after having been freed from the milk can be used for cooling purposes in future operations.

The partially concentrated milk is preferably subjected repeatedly to the refrigerating operation (two to three times if desired) and separation in a centrifugal machine or by other means until the product is of a sirupy consistence containing from eighty per cent. to ninety-five per cent. of solids. When the milk product has been reduced to this consistence, it is then subjected to the sterilizing operation at a temperature below zero.

The freezing cylinder, H (Fig. 2) having been reduced to a very low temperature by circulation of cold glycerine or other refrigerating medium through it, the dense concentrated milk is supplied to the funnel G′, and permitted to flow by gravity in thin streams upon the surface of the freezing cylinder H. As the milk freezes in thin films or layers on cylinder H, it is scraped off by knife K, or other device in the form of chips or flakes. The cylinder H, is preferably revolved slowly and the operation of freezing the milk thereon in thin layers and removing it by a scraper may be continuous; or, if desired, the concentrated milk may be distributed upon cylinder H for a few moments, while the scraping knife is out of contact therewith, then the supply of milk cut off and the scraping knife, K, made to bear against the cylinder until the film or layer of ice is removed in the form of chips or flakes. Cylinder, H, is preferably cooled to a temperature ranging from 10° to 20° Fahrenheit below zero, and always sufficiently low to destroy all pathogenic germs. By means of direct expansion ammonia coils properly arranged in a tank, very low temperatures can be obtained; and by using glycerine, which remains fluid at an extremely low temperature, as a medium of transmitting the cold, the freezing cylinder can be readily cooled as above described.

The operation of freezing the concentrated milk in films, as above described, is preferably performed in a vacuum and the flakes of frozen milk may be delivered directly into the vacuum pan, as fast as they are removed from the cooling cylinder.

It is not claimed that the mere freezing of milk to 32° Fahrenheit, or thereabout, destroys all germ life, but that extremely low temperatures, as described are required, and that every part of the substance must be subjected to this temperature,—a condition practicable only when in thin layers as described above.

The frozen milk, as above indicated, may be melted in the vacuum pan, and evaporated therein to dryness at a temperature not exceeding 100° Fahrenheit. I prefer, however, to discharge the frozen milk flakes into the tight box, M, until it is filled and then melt the contents by means of steam circulated in coil J, at which time valve, $l$, should be closed. The chamber, M, having been filled with melted milk product, valve, $p$, in pipe P is opened and the contents discharged into vacuum pan E. To perform this operation a partial vacuum is previously created in pan E, as described below.

A full charge of milk product having been supplied to the vacuum pan, live steam is forced into the pan by means of pipe $p''$ over the milk to expel all the air, so that the pan will contain only condensed milk and vapor,—valve $p$, and the other inlets to the pan are closed and the cooling chamber H started and the vapor cooled to about 100° Fahrenheit. The warm vapor rising from the milk condenses perfectly on the cooling cylinder and the condensation produces a sufficient and effective vacuum without the use of a pump. Hot water is run through the jacket of the pan, or the water in the jacket is heated by the coil, so as to maintain a uniform vapor temperature not to exceed 100° Fahrenheit, or sufficient to vaporize the water in the milk product, and the vapor is continuously condensed by contact with the freezing cylinder. Evaporation and concentration of the milk is preferably continued until the product is reduced to a semi-solid consistence or to such a consistence as will produce when cold, a solid mass suitable for shaving when cold. The operation having been completed in the vacuum pan the vacuum is preferably broken by using carbonic acid gas instead of atmospheric air, so as to avoid any oxidizing effect. The warm semi-solid product is run into molds and thus formed into cakes or blocks which are preferably allowed to cool at a low temperature. The process up to this stage produces condensed and sterilized milk and the product has been preserved in an atmosphere of carbonic acid gas.

My improved method of condensing and sterilizing milk is designed particularly to preserve the natural aroma of the milk and the integrity of the milk constituents.

To modify the composition of the milk and reduce the proportion of albuminoids when required, milk or cane sugar is added to the condensed milk, using only a saturated solution of sugar. After making a saturated solution of sugar it should be heated in a tight kettle until the pressure gage registers about four pounds, where it should be held for ten minutes at or near a temperature of 22° Fahrenheit to destroy all micro organisms. The sirup after sterilization is cooled and then run into the condensed milk in the vacuum pan and the stirrer put in motion as well as the cooling cylinder. After the milk has been concentrated to a semi-solid condition such proportion of cream is added as will produce a product containing the desired percentage of milk fat, preferably from ten to twenty-five per cent. Further condensation is then made to the desired condition. Previous to evaporation of cream with milk solids it may be sterilized on the cooling cylinder in the same manner as the condensed milk solids. After addition of the saturated sugar solution and the cream and evaporation of the whole batch to a semi-solid consistence when hot, the batch is drawn off into molds and cooled at a low temperature, so as to form blocks or cakes, as before explained. The solid blocks or cakes are then, by suitable mechanical means, shaved into thin shavings or chips, which are then placed upon the trays, $w$, which are inserted into the drying chambers, R', as shown in Fig. 3. The trays are constructed with bottoms of wire netting and covered with cloth, so that the warm dry carbonic acid gas may pass up through the contained shavings, as well as over the trays. The refrigerating cylinder is put in operation, steam is passed through the coils, S', in the warming chamber R'', carbonic acid gas is admitted by pipe J' to pipe P', and the pump, Q, put in operation. Vapor is drawn off from the drying chambers, through pipes, U, and L'', into the cooling chamber, G'', where all moisture is condensed. The dry carbonic acid gas passes thence through pipe P', through the pump, and is warmed by contact with the coils, S', in warming chamber R'' from which it passes through pipe T and its branch pipes, and their valves into any one or more of the drying chambers R'. When the contents of any one chamber, R', has been thoroughly dried, the valves on the inlet and outlet pipes of such chamber are closed, and the trays removed through the door, $v$. During the drying operation, the door, $v$, of each chamber is tightly closed or sealed. The carbonic acid gas, or other non-oxidizing gas is preferably heated to a temperature of about 100° Fahrenheit, and, after leaving the drying chamber, it is deprived of its moisture and returns again through the warming chamber and passes thence through the drying chamber, being continuously circulated by the pump. Fresh carbonic acid gas is admitted by pipe J', as required. The ice formed upon the freezing cylinder in chamber G'', is scraped off and deposited in box, M', from which it is periodically removed. After the milk shavings have been perfectly desiccated in the drying chamber, they are preferably cooled by circulation of cold dry carbonic acid gas, the steam at that time being shut off from the coils S'. The dry product and carbonic acid gas are then discharged into a receptacle previously filled with carbonic acid gas, and provided with cooling pipes to maintain the temperature below 32° Fahrenheit. From this receptacle the product is discharged through air tight tubes into the powdering mills, which are preferably operated in rooms cooled to 32° Fahrenheit. The milk fat contained in the product, is at this temperature, a hard and easily pulverized solid, when in combination with the other milk solids, and can be readily sieved in a well known manner. The powdered product which constitutes my infant's food, or milk powder, together with carbonic acid gas, is then discharged into a receptacle from whence it is filled into hermetically sealed bottles or cans which have been previously filled with carbonic acid gas without admixture of air. The carbonic acid gas acts as a preservative by excluding air and preventing oxidation of the milk fat, and, in addition to its preservative effect, exerts a bleaching or decolorizing effect that is of marked value, and that in no way deteriorates the product.

My prepared milk product, as prepared above, is white, has a fresh milk odor without rancidity or a cooked odor or taste, is quite soluble, forming with water an opaque white mixture, resembling milk in appearance, and the albuminoids are preserved therein without marked change. The proportions of albuminoids, milk fat, and sugar can be varied to make a product adapted for different uses.

As above indicated, the sterilized and melted milk product may be dried out in the vacuum pan at a temperature of about 100° Fahrenheit, but, the milk product when reduced in this well known manner passes into a lumpy, doughy, tough condition very difficult to manipulate. The operation in the pan is also very slow and tedious, and requires a long exposure to heat. The partially concentrated product may be drawn off from the vacuum pan and filled directly into cans or jars in the presence of carbonic acid gas, so as to present a product like ordinary condensed milk. I prefer, however, to prepare a perfectly desiccated powdered milk product and put it up for the trade, as detailed above.

I do not herein claim my milk product or article of manufacture as that is made the subject of a separate application for patent bearing Serial No. 475,626.

Having described my invention, what I claim, and desire to secure by Letters Patent, is—

1. The process of concentrating or condensing milk which consists in freezing the watery portion by refrigeration at the exposed upper surface of the milk, simultaneously breaking the ice crystals as formed, by suitable means into flakes or granules, thereby avoiding the locking up of milk solids in the ice crystals, and then separating the remaining unfrozen portions containing milk solids from said ice flakes or granules by centrifugal force or other means.

2. The process of concentrating or condensing milk which consists in freezing the watery portion by refrigeration at the exposed upper surface of the milk, simultaneously breaking the ice crystals as formed, by suitable means into flakes or granules, thereby avoiding the locking up of milk solids in the ice crystals, and then separating the remaining unfrozen portions containing milk solids from said ice flakes or granules by centrifugal or other force, and then continuing the concentration *in vacuo* at about 100° Fahrenheit, until the product is reduced to the desired density or consistence.

3. The process of concentrating or condensing milk, which consists in freezing the watery portion and breaking the ice, as formed, into flakes or granules, then separating the remaining constituents containing the milk solids, from said ice flakes or granules by centrifugal force, and in such operation projecting against the ice granules a current of steam, thereby preventing regelation and consequent locking up of milk constituents in the interstices of said granules.

4. The process of condensing and preserving milk which consists in freezing the watery portion and breaking the ice, as formed, into flakes or granules, then separating the remaining constituents containing the milk solids from said ice flakes or granules by suitable means, and then sterilizing such product by freezing it in films or flakes at a suitable temperature below zero to kill pathogenic germs.

5. The process of condensing and preserving milk, which consists in freezing the watery portion and breaking the ice into flakes or granules, then separating the remaining constituents containing the milk solids from said ice flakes or granules, distributing the resulting semi-fluid product in films upon a freezing cylinder and freezing it thereon at a temperature below zero to kill pathogenic germs and shaving or cutting the frozen films from said cylinder in the form of flakes or chips.

6. The process of condensing and preserving milk, which consists in freezing the watery portion and breaking the ice into flakes or granules, then separating the remaining constituents containing the milk solids from said flakes or granules, then sterilizing the resulting product by freezing at a suitable temperature below zero to kill pathogenic germs and then drying the products *in vacuo* to the desired density or consistence.

7. The process of condensing and preserving milk which consists in freezing the watery portion and separating the ice crystals from the remaining constituents,—sterilizing the resulting semi-fluid product at a suitable temperature below zero, then drying the product *in vacuo*, and then molding into blocks or cakes at a low temperature.

8. The process of condensing and preserving milk, which consists in removing the watery portion in the form of ice crystals from the solid constituents, drying the semi-fluid product *in vacuo*, to the desired density or consistence, molding such product into blocks, then shaving or comminuting the mass and drying the shavings by means of dry carbonic acid or other non-oxidizing gas circulated over and through them and finally powdering the dry shavings.

9. In the art of manufacturing condensed milk the process of preserving it which consists in subjecting shavings or chips of the condensed products to the drying action of dry warm carbonic acid or other non-oxidizing gas circulated through and over them, then powdering the dry shavings at about a freezing temperature, and filling into receptacles in the presence of carbonic acid or other non-oxidizing gas.

10. The process of manufacturing condensed milk which consists in first separating from fresh milk the cream or fat, then concentrating the milk by freezing out the water and separating the resulting ice crystals from the remaining constituents until reduced to the desired density, then sterilizing the semi-fluid product by refrigeration, partially drying the resulting product *in vacuo* at a temperature of about 100° Fahrenheit and then adding the separated cream and continuing the drying operation till the product is reduced to the desired consistence.

11. The process of manufacturing condensed milk, which consists in first separating from fresh milk, the cream or fat, then concentrating the milk by freezing out the water and separating the resulting ice crystals or granules from the remaining constituents till reduced to the desired density, then sterilizing the semi-fluid product by refrigeration, partially drying the resulting product *in vacuo* at a temperature of about 100° Fahre t, separately sterilizing the cream by refrigeration and adding it to the partially dried product in the vacuum pan and continuing the drying operation till the product is reduced to the desired consistence.

In testimony whereof I affix my signature in presence of two witnesses.

BYRON F. McINTYRE.

Witnesses:
 GEO. W. DREW,
 L. V. BEALE.